United States Patent [19]

Jefferson et al.

[11] 4,309,511
[45] Jan. 5, 1982

[54] PROCESS FOR PROMOTING THE LOW TEMPERATURE CURE OF POLYESTER RESINS

[75] Inventors: Donald E. Jefferson, Unionville; Charles G. Coe, Aston; Burton D. Beitchman, Springfield; Melville W. Uffner, Glen Mills, all of Pa.

[73] Assignee: Air Products and Chemicals, Inc., Allentown, Pa.

[21] Appl. No.: 45,446

[22] Filed: Jun. 4, 1979

[51] Int. Cl.³ .................. B01J 31/02; B01J 31/12; C03L 67/00
[52] U.S. Cl. .................. 525/14; 252/429 R; 252/431 C; 252/431 N; 525/17; 525/26
[58] Field of Search .................. 525/14, 26, 17; 252/429 R, 431 C, 431 N

[56] References Cited

U.S. PATENT DOCUMENTS

| | | | |
|---|---|---|---|
| 2,642,410 | 6/1953 | Hoppens | 525/14 |
| 2,647,878 | 8/1953 | Lee | 525/26 |
| 3,091,936 | 6/1963 | Lundberg et al. | 525/14 |
| 3,449,276 | 6/1969 | Rahenold et al. | 260/22 CA |
| 4,048,086 | 9/1977 | Uffner | 525/49 X |

FOREIGN PATENT DOCUMENTS 51-37197  3/1976  Japan .

*Primary Examiner*—J. Ziegler
*Attorney, Agent, or Firm*—Douglas G. Glantz; Russell L. Brewer; E. Eugene Innis

[57] ABSTRACT

This invention relates to an improved three component promoter for enhancing the cure rate of a molding compound comprising an unsaturated polyester resin and an unsaturated monomer copolymerizable therewith. The presence of the three component promoter system substantially enhances the cure rate of the molding compound while at the same time substantially lengthening the shelf life of the prepromoted resin. The three component system comprises a cobalt salt in the plus 2 valence state with the cobalt being present in an amount to provide from about 0.0005–0.06 parts cobalt metal per 100 parts unsaturated polyester resin (including unsaturated monomer), a copper salt, the salt being present in an amount to provide from $0.01-1\times10^{-6}$ parts copper metal per 100 parts of unsaturated polyester resin (including unsaturated monomer), and an amine selected from the group consisting of tertiary amino alkyl acrylates and methacrylates, heterocyclic amines, para substituted aromatic amines and lower alkyl and alkanol amines ($C_1$–$C_6$) and phenolic amines, the amine being present in an amount to provide from about 0.0001 to 0.05 moles per 100 parts of unsaturated polyester resin, including unsaturated monomer.

11 Claims, No Drawings

PROCESS FOR PROMOTING THE LOW TEMPERATURE CURE OF POLYESTER RESINS

BACKGROUND OF THE INVENTION

1. Field of the Invention

This invention relates to a process for the accelerating of cure rate in molding compositions comprising an unsaturated polyester resin and unsaturated monomer and it relates to promoter compositions for effecting such acceleration.

2. Description of the Prior Art

U.S. Pat. No. 4,048,086 discloses an accelerator composition which is particularly adapted for extending the shelf life of a polyester resin thickened with a calcium or magnesium oxide or hydroxide. The accelerator provided for fast cure while maintaining extended shelf life in its uncatalyzed state. The promoter consists of a cobaltic salt, e.g. cobaltic acetyl acetonate and a chemical thickener, i.e. magnesium or calcium oxide or hydroxide.

U.S. Pat. No. 3,449,276 discloses a triple accelerator system for promoting the cure of free radical catalyzed unsaturated polyester resins, the accelerator consisting of cobalt salt, a salt of an alkaline earth metal and a copper salt. The catalysts are particularly effective for accelerating free radical catalyzed polymerizable unsaturated polyester resins at low temperatures (e.g. 75° F.).

Japanese Pat. No. 51-37197 discloses an accelerator system consisting of a copper halide, 2,2' bypyridine, an aromatic amine, and a cobalt salt. The examples show that these accelerators, typically containing a cobalt naphthenate salt, copper chloride, bipyridine, and dimethyl- or diethylaniline give fast cure times when the polyester resin was catalyzed with the methylethyl ketone peroxide, the curing being effected at room temperature (25° C.)

The industry standard for promoting the cure of molding compounds at low temperatures has been a mixture of a cobalt salt and an aromatic amine, e.g. dimethylaniline. Although these accelerator compositions are extremely effective for providing fast cure times, the prepromoted polyester resin in its uncatalyzed state has an extremely short shelf life, e.g. 1 to 3 days.

SUMMARY OF THE INVENTION

This invention relates to an accelerator system for curing polyester resins, the accelerator system consisting of from about 0.0005 to 0.06 parts of a cobalt salt, from about 0.03 to $1 \times 10^{-6}$ parts of a copper salt, and from about 0.0001 to 0.05 moles of an amine selected from the group consisting of tertiary amino alkyl acrylates and methacrylates, lower alkyl and alkanol amines, phenolic amines and heterocyclic amines. These compositions when added to the unsaturated resin, including unsaturated monomer, provide an extremely long shelf life, e.g. 80 to 150 days in the absence of free radical initiator. On the other hand, the accelerator system is extremely fast when a peroxide is added to these polyester resins and cure times of from 5 to 15 minutes are obtained.

A promoter composition comprising in the following ratios (a) 1 g cobalt metal from a cobalt salt selected from cobalt halides, cobalt acetylacetonate, and cobalt salts of monocarboxylic acids having from 2–20 carbon atoms or dicarboxylic acids;

(b) from about 0.006 to 0.003 g copper metal from a copper salt selected from copper halides and copper salts of monocarboxylic acids having from 2–20 carbon atoms;

(c) from 0.016 to 4 g mole parts of an amine selected from the group consisting of heterocyclic amines.

The Applicants, by their invention, have achieved the following:

An accelerator which:

provides for extended shelf life at ambient temperatures;

provides for rapid gelation and fast cure times when catalyst is added to the polyester resin; and an accelerator composition which imparts little to no color to the unsaturated polyester resin thus eliminating many of the problems associated with color due to the presence of cobalt salts or high concentrations of amine.

DESCRIPTION OF THE PREFERRED EMBODIMENTS

In practicing this invention, the accelerator systems are used for catalyzing conventional unsaturated polyester resins. As is known, these are polymerizable mixtures of a polyester of an alpha-beta ethylenically unsaturated polycarboxylic acid and a polyhydric alcohol generally combined with an unsaturated monomer, e.g. a vinyl monomer. Examples of unsaturated polycarboxylic acids used in formulating polyester compositions include maleic acid, fumaric acid, citraconic acid, itaconic acid, and mesaconic. Of course the corresponding anhydrides can be used in place of the acids, and the term acid is to include the corresponding anhydride.

Polyhydric alcohols used in forming the polyester resin generally are ethylene glycol, pentaerythitol, trimethylol propane, trimethylol ethane, dipropylene glycol, polypropylene glycol, triethylene glycol and glycerol.

Although generally molding compositions of unsaturated polyester resin and vinyl monomer contain only unsaturated polycarboxylic acid, some saturated polycarboxylic acid can be present and utilized in combination with the unsaturated acid or anhydride. Generally less than 50%, and preferably less than 25% by weight saturated polycarboxylic acid is utilized in the formulation. Examples of saturated polycarboxylic acid which can be used include: succinic acid, adipic acid, phthalic acid, sebacic, terephthalic and azelaic acid.

Vinyl monomers are added to the unsaturated polyester resin to effect cross-linking of the acid to form thermoset materials. The vinyl monomer normally used is styrene, although other include vinyl acetate, allyl acetate, diallyl phthalate, triallyl cyanurate, diallyl fumarate, diallyl sebacate, methyl methacrylate, 2-ethylhexyl acrylate, divinyl benzene, alphamethyl styrene, and butyl acrylate.

The monomer component or components may be employed within a broad range, but usually the proportion, on a weight basis, is less than the polyester component. Typically, this is from about 10 to 60% by weight of the total mixture of polyester with preferred ranges being from about 20 to 50%.

As stated, the unique promoter system comprises three components, a copper salt, a cobalt salt and an amine.

The cobalt salt utilized in preparing the accelerator composition should be soluble or dispersible in the polyester resin, and generally organocobalt salts are preferred. Examples of cobalt salts include cobaltous acetylacetonate; cobalt halides, e.g. cobalt chloride, cobalt naphthenate, cobalt acetate, cobalt propionate and other cobalt salts of mono or dicarboxylic acids having from 2 to 20 carbon atoms. For room temperature cure of polyester resins, the cobalt must be in the cobaltous state. The cobaltic form promotes cure at higher temperature.

The copper salts used in the promoter are conventional to those used in polyester systems, and include copper salts of carboxylic acids having from about 2 to 20 carbon atoms and halides. These salts include copper naphthenate, copper laurate, copper stearate, copper octoate, and copper halide such as copper chloride and copper bromide.

The amines used in preparing the accelerator composition are in special classes. Aromatic amines, when used in combination with the copper and cobalt salts in appropriate amount results in a poor shelf life. Although the presence of copper and cobalt will extend the shelf life of an aromatic amine promoted polyester resin, the shelf life is substantially below that which is obtained by the appropriate selection of amines. Although not intending to be bound by theory, it is believed the parahydrogen on the aromatic amine accounts for the instability and poor shelf life in the polyester resin. By blocking the parahydrogen on the aromatic amine with a carbon atom from an organic moiety, one can further extend the shelf life and these can be used. However, the results will not compare as favorably with other classes of amines.

In formulating the promoter composition, we prefer to use heterocyclic amines, lower alkyl and alkanol amines, and tertiary alkyl amino acrylates or methacrylates, preferably heterocyclic. With respect to the heterocyclic amines, it is preferred the heterocyclic ring contain only carbon and nitrogen, although morpholine and other oxygen containing heterocyclics are suitable. Heterocyclic amines suited for the promoter include piperazine, N-methyl morpholine, 1-phenyl piperazine, pyridine, N-phenyl morpholine, N,N-dimethyl piperazine, diphenyl piperazine, imidazole, 1-methyl imidazole, bis(2-hydroxyethyl) piperazine; saturated polycyclic amines such as 1,4-diazabicyclo(2,2,2) octane (triethylenediamine), 1,5-diazabicyclo (4,3,0) non-5-ene, 1,5-diazabicyclo (5,4,0) undec-5-ene). Of the heterocyclic amines, the bicyclic amine, triethylenediamine, is preferred.

Other classes of amines which can be utilized in preparing a composition are lower alkyl and alkanol amines, e.g. those having from $C_1$ to $C_6$ carbon atoms and phenolic amines. These include methylamine, dimethylamine, trimethylamine, mono, di and triethylamine, mono, di and tripropylamine, butylamine, mono and triethanolamine, propanolamine, butanolamine and so forth. As a class, the alkyl and alkanol amines appear to give slower cure rates than the bicyclic amine triethylene diamine. However, the shelf lives for these classes of amines are excellent. A phenolic amine which gives desired results is tris(dimethylaminomethyl)-phenol.

The catalyst composition broadly will comprise from about 0.0005-0.06 weight parts cobalt as metal, and preferably from about 0.0075-0.03 weight parts cobalt metal per 100 parts polyester resin including the unsaturated monomer. This level is on a weight basis. As might be expected when the concentration of cobalt approaches the lower level, the benefits that would be achieved by the cobalt are reduced. Operating within the preferred range is desired in order to achieve the faster cure rate and extended shelf life.

The copper salt is used in a proportion to provide from about $0.03\text{-}1 \times 10^{-6}$ weight parts copper metal per 100 parts of polyester resin including unsaturated monomer. The preferred range is from about 0.0025 to about 0.0075. The broad range of cobalt and copper can provide a wide variation in using the two. As a general rule, there should be a particular ratio of cobalt to copper in the accelerator composition, and typically this ratio is from about 0.00017-0.5 parts copper per 1 part cobalt with the preferred range being about 0.003-0.3 parts copper per part cobalt.

The amine is incorporated in the polyester resin in a proportion to provide from about 0.0001 to 0.5 moles amine compound per 100 grams of unsaturated polyester resin including the vinyl monomer. Preferably, this ratio is from about 0.0008 to 0.009, particularly in the case of heterocyclic amines. When the amine concentration approaches the lower level of the range, then the cure times fall off substantially. On the other hand, as the amine concentration approaches the upper end of the range, then shelf life diminishes. It appears that the unsaturated polyester resin is extremely sensitive to the amine level and thus accounts for the relatively narrow range of amine used in the polyester resin composition as compared to the cobalt or copper salts.

In preferred cases, the cobalt and copper salts and amines are dispersed in a solvent and added to the polyester as a solution. A mixture of ethylene glycol and glycerin can be used for this purpose. The ratio of the preferred ranges of cobalt copper, and amine on a basis of a preferred composition of 1 g cobalt is from 0.0006-0.015 g copper and the amine is 0.016-4 g mole parts.

To effect cure of the polyester resin, which included unsaturated monomer, it is necessary to add a free radical initiator. For low temperature cure, various heat sensitive peresters, peroxides, or hydroperoxides are conventionally utilized. For low temperature cure, methylethyl ketone peroxide is preferred. Other examples of free radical initiators which can be used include t-butyl perbenzoate, t-butyl peroctoate, cumene hydroperoxide, diisopropyl hydroperoxide, 1,1,1,3,3-tetramethyl butyl hydroperoxide.

As is customary in the molding industry, various components can be added to the unsaturated polyester resin to achieve specific purposes. For example, chemical thickeners such as magnesium and calcium oxide or hydroxide are utilized. Fillers, e.g. calcium carbonate, clay, asbestos and aluminum hydrate; lubricants such as zinc stearate, calcium stearate, polyethylene, as well as pigments, e.g. titanium dioxide, ferric oxide, zinc oxide, zinc sulfide and the like can be employed for the desired purpose. Optionally, glass fibers having a length of from about ¼ to 2" can be incorporated in the molding compound to produce a reinforced polyester material.

The following examples are provided to illustrate preferred embodiments of the invention and are not intended to restrict the scope thereof. All parts are parts by weight, and all percentages are expressed as weight percentages unless as otherwise specified. The polyester resin utilized in each of the examples are conventional unsaturated polyester resins sold under the trademark PARAPLEX P-43 by the Rohm & Haas Company and are dissolved in styrene. The ratio of PARAPLEX P-43 polyester resin to styrene used on a weight basis was 80 parts to 20 parts.

Gel times were measured by inverting a filled vial back and forth until resin flow ceased. Cure times were determined by removing a prepromoted sample from a constant temperature bath (70° C.) injecting the given amount of methylethylketone peroxide and placing this in a insulated container. A thermocouple was then placed in the sample and the exotherm recorded.

EXAMPLE 1

Three resin formulations were prepared by mixing, on a weight basis, the components set forth in Table 1 below. After preparation of samples, the stability or shelf life of the prepromoted resin was periodically (daily or weekly) obtained by observing stored samples for any indication of gellation. If inverting the samples produced no free flow, resin was considered no longer useful and the shelf life study was terminated at that point.

The profile of the reaction was measured by adding methylethyl ketone peroxide as the free radical initiator (Lupersol DDM) in the amount specified and recording the resulting exotherm. Cure time is defined as that time from addition of the peroxide to the production of the peak exotherm.

TABLE 1

|  | Prior Art | A | B |
|---|---|---|---|
| Resin Paraplex P-43/Styrene (80/20) | 100 | 100 | 100 |
| Cobalt Naphthenate (3% $Co^{+2}$) gms | 1.0 | — | — |
| Cobolt Acetate (3% $Co^{+2}$) gms | — | 1.0 | 1.0 |
| (Gms Eqivalent Cobalt Metal) | (0.03) | (0.03) | (0.03) |
| $CuCl_2 . 2H_2O$ (1% $Cu^{+2}$) | — | 0.5 | 0.5 |
| (Gms Equivalent Copper Metal) | — | (0.005) | (0.005) |
| Dimethylaniline gms | 0.2 | — | — |
| 1-Phenyl Piperazine gms | — | 0.27 | — |
| triethylenediamine gms | — | — | 0.19 |
| (Moles Amino Compound) | (0.00165) | (0.00165) | (0.00165) |
| Lupersol DDM (60% $MEKO_2$) | 2.0 | 2.0 | 2.0 |
| Exotherm Data at 75° F. | | | |
| Gel Time (Minutes) | 13'34" | 3'36" | 6'37" |
| Cure Time (Minutes) | 36'57" | 6'06" | 14'13" |
| Color (Cured Product) | 4 Dark Amber | 3 Yellow | 2 Blue Tint |
| Time to Tack Free | 4 Hrs. | 8 Min. | 23 Min. |
| Time to Obtain a Barcol Hardness of 40 | 5–6 Hrs. | 37 Min. | 1–2 Hrs. |
| Shelf Life of Pre-promoted Resin | 36 Hrs. | 30 Days | 30 Days |

Runs A and B, which utilize the heterocyclic amine in combination with the cobalt and copper salts, have substantially shorter gel and cure times than the industry standard (prior art) using dimethylaniline and cobalt naphthenate. In addition, the shelf life was greater than 30 days, whereas the dimethylaniline promoted resin had a shelf life of less than 36 hours.

EXAMPLE 2

The procedure of Example 1 was repeated except that accelerator systems were compared against an accelerator system as described in U.S. Pat. No. 3,449,276, i.e. one containing a cobalt salt, copper salt and alkaline earth metal. The results are set forth in Table 2 below.

TABLE 2

|  | A Prior Art | B |
|---|---|---|
| Resin Paraplex P-43/Styrene (80/20) | 100 | 100 |
| Cobalt Octoate (6% $Co^{+2}$) gms | 0.1 | 0 |
| Cobalt Acetate (3% $Co^{+2}$) gms | — | 0.25 |
| (Gms Equivalent Cobalt Metal) | (0.006) | (0.0075) |
| Calcium Octoate (5%) gms | 0.05 | — |
| (Gms Equivalent Calcium Metal) | (0.0025) | — |
| $CuCl_2 . 2H_2O$ (1% $Cu^{+2}$) gms | — | 0.125 |
| (Gms Equivalent Copper Metal) | — | (0.00125) |
| 1-Phenyl Piperazine gas | — | 0.0675 |
| (Moles Amino Compound) | — | (0.00041) |
| Luperson DDM (60% $MEKO_2$) | 1.67 | 1.67 |
| Exotherm Data at 75° F. | | |
| Gel Time (Minutes) | 258 | 8'30" |
| Cure Time (Minutes) | 4 Hrs. | 30'40" |
| Time to Tack Free | 6–18 Hrs. | 47 Min. |
| Time to Obtain a Barcol Hardness of 40 | 6–18 Hrs. | 1–2 Hrs. |
| Shelf life of Pre-promoted Resin | 30 Days | 30 Days |

The prior art accelerator compositions utilizing the mixture of cobalt, copper, and alkaline earth metal, e.g. calcium octoate, have substantially longer gel times and were slower to cure to a Barcol hardness of 40 as compared to the amine promoted systems. Color and shelf life for the systems appear to be quite similar.

EXAMPLE 3

The procedure of Example 1 was repeated except that the three component accelerator system of this invention was compared versus a cobalt alone, a cobalt-copper, and a cobalt-amine system in order to determine the effect of an absence of each component to the polyester resin. Table 3 shows these results.

TABLE 3

| 3-Component System versus Cobalt, Cobalt/Copper, Cobalt/Amino | | | | | | | | |
|---|---|---|---|---|---|---|---|---|
|  | 1 | 2 | 3 | 4 | 5 | 6 | 7 | 8 |
| Resin Paraplex P-43/Styrene (80/20) | 100 | 100 | 100 | 100 | 100 | 100 | 100 | 100 |
| Cobalt Naphthenate (6% $Co^{+2}$) gms | 0.5 | 0.5 | 0.5 | 0.5 | 1.0 | 1.0 | 1.0 | 1.0 |
| (Gms Equivalent Cobalt Metal) | (0.03) | (0.03) | (0.03) | (0.03) | (0.03) | (0.03) | (0.03) | (0.03) |
| 1,4-Diazabicyclo (2.2.2) octane gms | — | — | 0.56 | 0.56 | — | — | 1.0 | 1.0 |
| Triethylamine | — | — | — | — | — | — | 1.0 | 1.0 |
| (Moles Amino Compound) | — | — | (0.00495) | (0.00495) | — | — | (0.0099) | (0.0099) |
| $CuCl_2 . H_2O$ (1% $Cu^{+2}$) gms | — | 0.5 | — | 0.5 | — | 0.5 | — | 0.5 |
| (Gms Equivalent Copper Metal) | — | (0.005) | — | (0.005) | — | (0.005) | — | (0.005) |
| Lupersol DDM (60% $MEKO_2$) | 3.0 | 3.0 | 3.0 | 3.0 | 3.0 | 3.0 | 3.0 | 3.0 |
| SPI Block Exotherm Data at 75° F. | | | | | | | | |
| Cure Time (Minutes) | 62'57" | 15'18" | 13'08" | 6'06" | 22'31" | 14'44" | 13'24" | 9'05" |
| Stability of Pre-promoted Resin | 150 Days | 150 Days | 120–125 Days | 150 Days | 150 Days | 150 Days | 120–125 Days | 150 Days |

These results show the importance of the three component system in obtaining fast gel times. At the same time, the shelf life is maintained.

These runs show that the cure times for cobalt alone, the cobalt and copper or the cobalt-amine promoted system are substantially longer than the resin cured with the three component system of this invention. The shelf life is generally shorter but not much; basically, the the catalyst. The preferred amine, triethylenediamine, was used as the amine. Table 5 presents these results.

TABLE 5

Effect of Copper Chloride . $2H_2O$ ($Cu^{+2}$) Concentration With Cobalt Acetate/Triethylenediamine

| | 1 | 2 | 3 | 4 | 5 | 6 | 7 | 8 | 9 |
|---|---|---|---|---|---|---|---|---|---|
| Resin Paraplex P-43/Styrene (80/20) | 100 | 100 | 100 | 100 | 100 | 100 | 100 | 100 | 100 |
| Cobalt Acetate . $4H_2O$ gms (3% $Co^2$) | 1.0 | 1.0 | 1.0 | 1.0 | 1.0 | 1.0 | 1.0 | 1.0 | 1.0 |
| (Gms Equivalent Cobalt Metal) | (0.03) | (0.03) | (0.03) | (0.03) | (0.03) | (0.03) | (0.03) | (0.03) | (0.03) |
| (Gms Equivalent Copper Metal) See * below. | — | (0.03) | (0.01) | (0.005) | (0.001) | (0.0005) | (0.0001) | (0.00005) | (0.000001) |
| 1,4-Diazabicyclo (2.2.2) gms octane (triethylenediamine) | 0.38 | 0.38 | 0.38 | 0.38 | 0.38 | 0.38 | 0.38 | 0.38 | 0.38 |
| (Moles Amino Compound) | (0.0033) | (0.0033) | (0.0033) | (0.0033) | (0.0033) | (0.0033) | (0.0033) | (0.0033) | (0.0033) |
| Lupersol DDM (60% $MEKO_2$) | 2.0 | 2.0 | 2.0 | 2.0 | 2.0 | 2.0 | 2.0 | 2.0 | 2.0 |
| SPI Block Exotherm Data at 75° F. | | | | | | | | | |
| Gel Time (Minutes) | 5'37" | 6'17" | 4'26" | 2'56" | 3'32" | 3'45" | 4'48" | 5'06" | 5'42" |
| Cure Time (Minutes) | 12'00" | 13'28" | 8'41" | 6'18" | 7'15" | 7'44" | 9'47" | 10'18" | 12'15" |
| Peak Exotherm, °F. | 373 | 381 | 377 | 393 | 395 | 389 | 382 | 387 | 375 |
| Weight ratio copper to cobalt | 0 | 1:1 | 0.33 | 0.16 | 0.03 | 0.016 | 0.003 | 0.0016 | 0.0003 |

Although good results are shown over the full range of copper concentration, the results also show that a copper to cobalt ratio of from about 0.003 to 0.3 gives good gel and cure times. Table 3 using similar components shows good shelf lives are obtained with the polyester. Run 2, as compared to Runs 3 and 4, show that excess copper, above 0.01%, results in higher cure time. Shelf life is not adversely affected.
*Gms Equivalent Copper Metal added in the form of $CuCl_2$ . $2H_2O$ in solutions of 3.0%, 1.0%, 0.1%, and 0.01% $Cu^{+2}$.

difference lies in the cure rate. (Note Run 4)

EXAMPLE 4

The procedure of Example 1 was repeated comparing the effect of a three component system with dimethylaniline and heterocyclic amine triethylenediamine. Table 4 presents these results.

TABLE 4

Comparison of Standard Cobalt Naphthenate/Dimethylaniline versus 3-Component System of Cobalt Acetate/Copper Chloride/1-Phenyl Piperazine

| | 1 | Prior Art 2 | 3 | Prior Art 4 | 5 | 6 |
|---|---|---|---|---|---|---|
| Resin Paraplex P-43/Styrene (80/20) | 100 | 100 | 100 | 100 | 100 | |
| Cobalt Acetate . $4H_2O$ (3% + $Co^{+2}$) gms | 1.0 | 1.0 | 1.0 | 1.0 | 1.0 | 1.0 |
| (Gms Equivalent Cobalt Metal) | (0.03) | (0.03) | (0.03) | (0.03) | (0.03) | (0.03) |
| $CuCl_2$ . $2H_2O$ (1% $Cu^{+2}$) | — | 0.5 | — | 0.5 | — | 0.5 |
| (Gms Equivalent Copper Metal) | — | (0.005) | — | (0.005) | — | (0.005) |
| Dimethylaniline | — | — | 0.2 | 0.2 | — | — |
| 1,4-Diazabicyclo(2.2.2) octane | — | — | — | — | 0.56 | 0.56 |
| (Moles Amino Compound) | — | — | (0.00165) | (0.00165) | (0.00495) | (0.00495) |
| Lupersol DDM (60% $MEKO_2$) | 3.0 | 3.0 | 3.0 | 3.0 | 3.0 | 3.0 |
| SPI Block Exotherm Data at 75° F. | | | | | | |
| Cure Time (Minutes) | 22'31" | 14'44" | 6'02" | 5'12" | 8'15" | 4'36" |
| Peak Exotherm, °F. | 369 | 382 | 414 | 410 | 398 | 405 |
| Stability of Pre-promoted Resin | — | — | 24 Hrs. | 30 Days | 87 Days | 142 Days |

The addition of copper to the systems shows that it is effective for extending shelf life. The industry standard, i.e., the dimethylaniline system, is inferior to the triethylenediamine system of this invention.

These results also show that the copper concentration can be varied from a level to provide from about 0.005 to about $1 \times 10^{-6}$ and still result in acceleration of the cure rate for polyester resin.

EXAMPLE 6

The procedure of Example 1 was repeated except that various amines were tested in the accelerator system. Table 6 provides these results. Each formulation contained 100 parts Paraplex P-43, 0.03 gm equivalents cobalt as cobalt acetate and 0.005 gm equivalents copper as copper chloride. The system was catalyzed with methylethyl ketone peroxide at a level of 2 gm of a 60% solution.

EXAMPLE 5

The procedure of Example 1 was repeated except that the concentration of copper was varied in a standard accelerator system to determine its influence on

TABLE 6

Cure Time/Stability of Cobalt/Copper/Amino Complexes

| Amino Compounds | Concentration Moles/(Grams) | Cure Time (After 1 Hr.) | Stability[2] | Days Storage | Cure Time After[3] Storage | Color (Cured Product) |
|---|---|---|---|---|---|---|
| N,N-Dimethylaniline[1] | 0.00165 (0.2) | 7'19" | 9–24 Hrs. | — | — | Dark Amber |
| 1,4-Diazabicyclo (2.2.2)octane | 0.00165 (0.19) | 7'08" | 90 Days | 60 | 6'34" | Light Tan |
|  | 0.00495 (0.56) | 4'41" | 90 Days | 60 | 3'51" | Light Tan |
|  | 0.00825 (1.35) | 4'00" | 65 Days | 60 | 3'13" | Light Amber |
| Piperazine . 6H$_2$O | 0.00165 (0.32) | 8'45" | 30 Days | 30 | 8'40" | Light Amber |
|  | 0.00495 (0.96) | 6'26" | 30 Days | 30 | 6'01" | Light Amber |
|  | 0.00825 (1.60) | 5'41" | 30 Days | 30 | 5'33" | Dark Amber |
| N-Phenyl Morpholine | 0.00165 (0.27) | 7'13" | 90 Days | 85 | 5'55" | Light Tan |
|  | 0.00495 (0.81) | 6'20" | 90 Days | 85 | 5'20" | Light Amber |
|  | 0.00825 | 5'56" | 90 Days | 85 | 4'43" | Dark Amber |
| N-Phenyl Piperazine | 0.00083 (0.135) | 6'05" | 90 Days | 85 | 5'14" | Light Amber |
|  | 0.00165 (0.27) | 4'55" | 90 Days | 85 | 3'56" | Light Amber |
|  | 0.00495 (0.81) | 2'40" | 90 Days | 85 | 2'05" | Dark Amber |
| 4,4'-Bis(dimethyl-amino)benzophenone | 0.00083 (0.22) | 6'20" | 30 Days | 30 | 6'03" | Light Green |
|  | 0.00165 (0.44) | 4'23" | 30 Days | 30 | 4'13" | Dark Green |
|  | 0.0033 (0.88) | 3'07" | 30 Days | 30 | 2'56" | Dark Brown |

[1]Control standard consisting of 1.0 grams (0.03 grams equivalent Co$^{+2}$) Co(Acetate)$_2$
[2]Stability of pre-promoted resin (without peroxide)
[3]Cure time of pre-promoted resin after days storage ambient temperature (70–75° F.)
All of the amines worked well with the exception of N,N-dimethyl aniline and there the shelf life was poor. The best results in terms of color and cure rate were obtained with diazabicyclooctane.

This example shows (except for DMA) that after considerable storage, the pre-promoted resin has not lost any of its potency for producing an accelerated cure. All the amines except N,N-dimethylaniline have superior shelf life and comparable cure times. Overall, the triethylenediamine catalyst is superior in terms of cure rate, stability and color. N-phenyl piperazine gives desirable results but presents a potential industrial health hazard.

EXAMPLE 7

The procedure of Example 6 was repeated for the purpose of testing additional amines. The results are shown in Tables 7, 8 and 9.

TABLE 7

Additional Amines Useful For This Invention

|  | 1 | 2 | 3 | 4 | 5 | 6 | 7 | 8 |
|---|---|---|---|---|---|---|---|---|
| Resin Paraplex P-43/Styrene (80/20) | 100 | 100 | 100 | 100 | 100 | 100 | 100 | 100 |
| PEP —183S (3% Co$^{+2}$) (Gms Equivalent Cobalt Metal) | 1.0 (0.03) | 1.0 (0.03) | 1.0 (0.03) | 1.0 (0.03) | 1.0 (0.03) | 1.0 (0.03) | 1.0 (0.03) | 1.0 (0.03) |
| CuCl$_2$ . 2H$_2$O (1% Cu$^{+2}$) (Gms Equivalent Copper Metal) | — | 0.5 (0.005) | — | 0.5 (0.005) | — | 0.5 (0.005) | — | 0.5 (0.005) |
| 1,5-Diazabicyclo(4.3.0) non-5-ene | — | — | 1.0 | 1.0 | — | — | — | — |
| Pyridine | — | — | — | — | 0.65 | 0.65 | — | — |
| Triethanolamine | — | — | — | — | — | — | 1.0 | 1.0 |
| (Moles Amino Compound) | — | — | (0.0081) | (0.0081) | (0.00825) | (0.00825) | (0.007) | (0.007) |
| TLupersol DDM (60% MEKO$_2$) | 3.0 | 3.0 | 3.0 | 3.0 | 3.0 | 3.0 | 3.0 | 3.0 |
| SPI Block Exotherm Data at 75° F. | | | | | | | | |
| Cure Time (Minutes) | 22'41" | 10'24" | 12'18" | 8'15" | 17'37" | 9'27" | 14'41" | 7'22" |
| Peak Exotherm, F.° | 380 | 375 | 396 | 414 | 400 | 400 | 394 | 403 |

PEP —183S catalyst is a mixture of 18% cobalt acetate and triethylenediamine in a 1:1 mole ratio diluted with 82% glycol and glycerine by weight.

TABLE 8

|  | 7 | 8 | 9 | 10 | 11 | 12 |
|---|---|---|---|---|---|---|
| Resin | 100 | 100 | 100 | 100 | 100 | 100 |

TABLE 8-continued

|  | 7 | 8 | 9 | 10 | 11 | 12 |
|---|---|---|---|---|---|---|
| Cobalt Acetate | See below | See below | 1.0 | 1.0 | 1.0 | 1.0 |
| (Gms Equivalent Cobalt Metal) | 0.03 | 0.03 | 0.03 | 0.03 | 0.03 | 0.03 |
| $CuCl_2$ | — | 0.5 | — | 0.5 | — | 0.5 |
| (GMS Equivalent Copper Metal) | — | 0.005 | — | 0.005 | — | 0.005 |
| Tris(dimethylaminomethyl) phenyl | 1.31 | 1.31 | — | — | — | — |
| Triethylamine | — | — | 1.0 | 1.0 | — | — |
| 4 dimethylaminopyridine | — | — | — | — | 1.01 | 1.01 |
| Moles amino compound | 0.005 | 0.005 | 0.010 | 0.010 | 0.00825 | 0.00825 |
| Cure time | 17'37" | 9'27" | 13'24" | 9'05" | 17'48" | 9'18" |
| Peak Exotherm | 400 | 400 | 372 | 391 | 380 | 395 |

Tris dimethylaminomethyl phenol was carried out with 0.5g cobalt naphthenate providing 0.03 gms eg cobalt metal.

TABLE 9

|  | 11 | 12 | 13 | 14 |
|---|---|---|---|---|
| Resin Paraplex P-43/Styrene (80/20) | 100 | 100 | 100 | 100 |
| Cobalt Acetate . $4H_2O$ (3% $Co^{+2}$) | 1.0 | 1.0 | 1.0 | 1.0 |
| (Gms Equivalent Cobalt Metal) | (0.03) | (0.03) | (0.03) | (0.03) |
| $CuCl_2$ . $2H_2O$ (1% $Cu^{+2}$) | — | 0.5 | — | 0.5 |
| (Gms Equivalent Copper Metal) | — | (0.005) | — | (0.005) |
| N,N-dimethyl piperazine | 0.19 | 0.19 | — | — |
| 1,5-Diazabicyclo(4.3.0) non-5-ene | — | — | 2.0 | 2.0 |
| 4-Dimethylamino pyridine | — | — | — | — |
| N,N-dimethyl naphthylamine | — | — | 0.28 | 0.28 |
| N,N-dimethylaminoethyl methacrylate | — | — | — | — |
| (Moles Amino Compound) | (0.00165) | (0.00165) | (0.0161) | (0.0161) |
| Lupersol DDM (60% $MEKO_2$) | 3.0 | 3.0 | 3.0 | 3.0 |
| SPI Block Exotherm Data at 75° F. | | | | |
| Cure Time (Minutes) | 13'52" | 7'30" | 11'43" | 5'39" |
| Peak Exotherm, °F. | 380 | 412 | 395 | 419 |

What we claim is:

1. In a process for curing a molding compound comprising an unsaturated polyester resin and unsaturated monomer copolymerizable therewith, the improvement for accelerating the cure rate of the molding compound while extending its shelf life in its uncatalyzed state, which comprises as a promoter
    a cobalt salt with the cobalt salt being present in a proportion to provide from 0.0005–0.06 parts cobalt metal per 100 parts by weight of unsaturated polyester resin including unsaturated monomer;
    a copper salt, the copper salt being present in a proportion to provide from 0.03-1 × $10^{-6}$ parts copper metal per 100 parts by weight unsaturated polyester resin including unsaturated monomer; and
heterocyclic amines, the amine compound being present in an amount to provide from about 0.0001 to 0.05 moles amine per 100 parts unsaturated polyester resin including unsaturated monomer.

2. The process of claim 1 wherein the cobalt salt is present in a proportion to provide from about 0.0075–0.03 parts.

3. The process of claim 2 wherein the copper salt is present in a proportion to provide from about 0.0025–0.0075 parts copper.

4. The process of claim 3 wherein the amine is present in a proportion to provide from about 0.0008 to 0.009 moles amine per 100 parts unsaturated polyester resin including unsaturated monomer.

5. The process of claim 1 wherein the ratio of copper metal to cobalt metal is from about 0.00017–0.5 weight parts copper per part cobalt.

6. The process of claim 5 wherein said cobalt promoter is selected from the group consisting of cobalt halides and monocarboxylic acid salts of cobalt.

7. The process of claim 6 wherein the copper salt is selected from the group consisting of copper halides and monocarboxylic acid salts of copper.

8. The process of claim 7 wherein said heterocyclic amine has only carbon and nitrogen atoms in the ring.

9. The process of claim 8 wherein said heterocyclic composition is a bicyclic heterocyclic amine.

10. The process of claim 9 wherein said bicyclic amine is triethylenediamine.

11. A promoter composition comprising in the following ratios
    (a) 1 g cobalt metal from a cobalt salt selected from cobalt halides, cobalt acetylacetonate, and cobalt salts of monocarboxylic acids having from 2–20 carbon atoms;
    (b) from about 0.0006–0.003 g. copper metal from a copper salt selected from copper halides and copper salts of monocarboxylic acids having from 2–20 carbon atoms;
    (c) from 0.016-4 g. mole parts of an amine selected from the group consisting of heterocyclic amines.

* * * * *